(12) United States Patent
Koiso

(10) Patent No.: US 12,394,053 B2
(45) Date of Patent: Aug. 19, 2025

(54) OPEN OR CLOSED EYE DETERMINATION APPARATUS, OPEN OR CLOSED EYE DETERMINATION METHOD, AND RECORDING MEDIUM FOR OPEN OR CLOSED EYE DETERMINATION

(71) Applicant: JVCKENWOOD Corporation, Yokohama (JP)

(72) Inventor: Hisashi Koiso, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 84 days.

(21) Appl. No.: 18/463,469

(22) Filed: Sep. 8, 2023

(65) Prior Publication Data

US 2023/0419490 A1    Dec. 28, 2023

Related U.S. Application Data

(63) Continuation of application No. PCT/JP2021/033922, filed on Sep. 15, 2021.

(30) Foreign Application Priority Data

Mar. 10, 2021    (JP) ................................ 2021-038073

(51) Int. Cl.
*G06T 7/00* (2017.01)

(52) U.S. Cl.
CPC .. *G06T 7/0012* (2013.01); *G06T 2207/30041* (2013.01); *G06T 2207/30201* (2013.01)

(58) Field of Classification Search
CPC . G06T 2207/30201; G06T 2207/30268; G06T 7/73; G06V 40/164; G06V 40/18;
(Continued)

(56) References Cited

U.S. PATENT DOCUMENTS

2006/0203088 A1\* 9/2006 Hammoud ............. G08B 21/06
                                                                 348/78
2009/0310829 A1    12/2009 Baba et al.
(Continued)

FOREIGN PATENT DOCUMENTS

JP        2007151798 A  *  6/2007
JP           4471607 B2  *  6/2010
(Continued)

OTHER PUBLICATIONS

Extended European Search Report from EP Application No. 21930262.7 mailed Jun. 17, 2024, 7 pages.
(Continued)

*Primary Examiner* — Marnie A Matt
(74) *Attorney, Agent, or Firm* — Shih IP Law Group, PLLC

(57) ABSTRACT

A video acquisition unit in an open or closed eye determination apparatus acquires video data from a camera. A face orientation detection unit detects a face orientation based on a face image in the video data acquired by the video acquisition unit. An eye image extraction unit extracts an eye image including an eye region based on the face image in the video data acquired by the video acquisition unit. An open or closed eye determination unit determines an open or closed eye state based on an amount of eye openness acquired from the eye image, an open eye reference value, and a closed eye reference value. The open or closed eye determination unit has the open eye reference value and the closed eye reference value corresponding to a face orientation and switches the open eye reference value and the closed eye reference value based on the face orientation.

4 Claims, 7 Drawing Sheets

(58) Field of Classification Search
CPC .. G06V 40/193; G06V 40/197; G06V 20/597; H04N 23/611
USPC .......................................................... 348/78
See application file for complete search history.

(56) References Cited

U.S. PATENT DOCUMENTS

| | | | |
|---|---|---|---|
| 2011/0235919 A1* | 9/2011 | Morita ................... | G08B 29/26 |
| | | | 382/195 |
| 2016/0025971 A1* | 1/2016 | Crow ..................... | A61B 3/113 |
| | | | 345/156 |
| 2019/0122044 A1* | 4/2019 | Noble .................... | G06V 20/597 |
| 2020/0218878 A1* | 7/2020 | Mequanint ........... | G08B 21/182 |
| 2021/0070306 A1* | 3/2021 | Yamauchi .............. | B60W 50/14 |

FOREIGN PATENT DOCUMENTS

| | | | |
|---|---|---|---|
| JP | 2010134490 A | | 6/2010 |
| WO | WO-2021024905 A1 | * | 2/2021 |

OTHER PUBLICATIONS

International Search Report for the corresponding PCT Application No. PCT/JP2021/033922 mailed Dec. 7, 2021, 4 pages.
International Preliminary Examination Report on Patentability (I) for the corresponding PCT Application No. PCT/JP2021/033922 mailed Sep. 12, 2023, 8 pages.

* cited by examiner

OPEN OR CLOSED EYE DETERMINATION APPARATUS, OPEN OR CLOSED EYE DETERMINATION METHOD, AND RECORDING MEDIUM FOR OPEN OR CLOSED EYE DETERMINATION

CROSS-REFERENCE TO RELATED APPLICATION

This application is a continuation of application No. PCT/JP2021/033922, filed on Sep. 15, 2021, and claims the benefit of priority from the prior Japanese Patent Application No. 2021-038073, filed on Mar. 10, 2021, the entire content of which is incorporated herein by reference.

BACKGROUND

1. Field of the Disclosure

The present invention relates to an open or closed eye determination apparatus and an open or closed eye state determination method.

For example, a driver monitor, etc. mounted on a vehicle images a vehicle cabin and stores an image including the driver in a storage apparatus. The captured image of the vehicle cabin is used to check, for example, the driving situation such as the direction in which the driver's face is facing, the behavior of a passenger in the vehicle cabin, etc.

For example, Patent Literature 1 discloses a related-art detection apparatus that detects the open or closed eye state. The detection apparatus includes a face orientation detection unit, an eye detection unit, and an openness or closedness scale calculation unit. The face orientation detection unit detects the orientation of a person's face based on a face image of the face of a person taken by a camera. The eye detection unit detects the size of the person's eyes based on the face image. The openness or closedness scale calculation unit calculates the openness or closedness scale indicating how open the eyes of a person are based on the size of the person's eyes in the face image, by correcting the scale to a value that results when the person's face is viewed from the front based on the detected orientation of the person's face.

[Patent Literature 1] JP2010-134490

SUMMARY

Patent Literature 1 discloses correcting the eye openness or closedness scale with a calculated value in accordance with the orientation of the face. We have found that, when the orientation of the face swings in the left or right direction, the actual measured value of the amount of eye openness differs from the calculated value due to the influence of the undulation of the eyelid, even if the openness scale of the eye remains the same. We have thought that there is a room for improvement in the precision of determination of the open or closed eye state. We have also found that, when the camera is disposed in front of and diagonally above the face, the actual measured value of the amount of eye openness may change significantly and the precision of determination of the open or closed eye state may drop when the face swings in the left or right direction.

The present embodiments addresses the issue described above, and a purpose thereof is to provide an open or closed eye determination apparatus and an open or closed eye determination method capable of precisely determining an open or closed eye state based on a face image taken.

An aspect of the present embodiment relates to an open or closed eye determination apparatus. The open or closed eye determination apparatus includes: a video acquisition unit that acquires video data from a camera; a face orientation detection unit that detects a face orientation based on a face image in the video data acquired by the video acquisition unit; an eye image extraction unit that extracts an eye image including an eye region based on the face image in the video data acquired by the video acquisition unit; and an open or closed eye determination unit that determines an open or closed eye state based on an amount of eye openness acquired from the eye image, an open eye reference value, and a closed eye reference value, wherein the open or closed eye determination unit has the open eye reference value and the closed eye reference value corresponding to a face orientation and switches the open eye reference value and the closed eye reference value based on the face orientation detected by the face orientation detection unit.

An aspect of the present embodiment relates to an open or closed eye determination method in an open or closed eye determination apparatus. The open or closed eye determination method includes: acquiring video data from a camera; detecting a face orientation based on a face image in the video data acquired; extracts an eye image including an eye region based on the face image in the video data acquired; and determining an open or closed eye state based on an amount of eye openness acquired from the eye image, an open eye reference value, and a closed eye reference value, wherein the determining has the open eye reference value and the closed eye reference value corresponding to a face orientation and switches the open eye reference value and the closed eye reference value based on the face orientation detected.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

Figure 1:
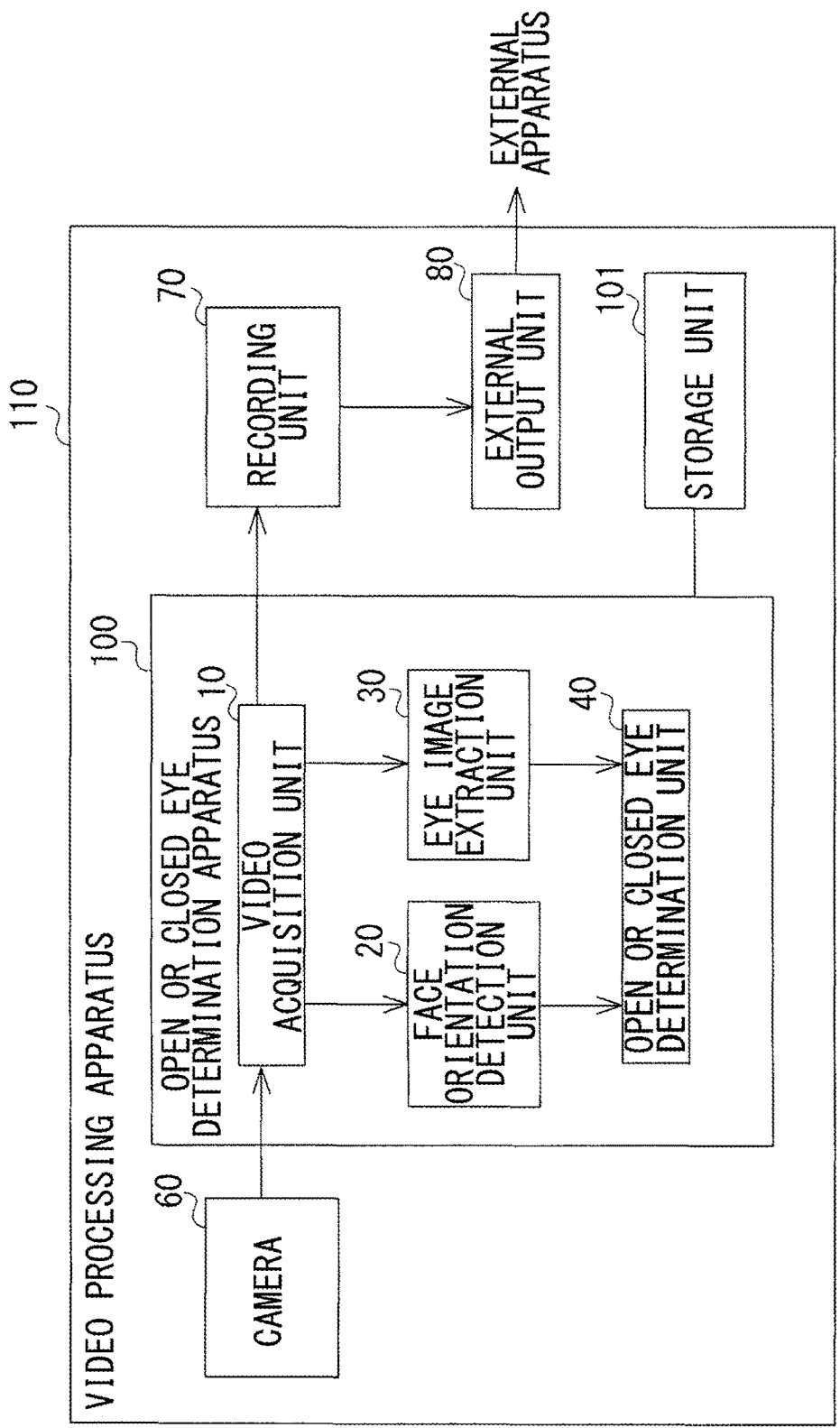
FIG. 1 is a block diagram showing a configuration of a video processing apparatus including an open or closed eye determination apparatus according to an embodiment.

The invention will now be described by reference to the preferred embodiments. This does not intend to limit the scope of the present invention, but to exemplify the invention. Hereinafter, the invention will be described based on a preferred embodiment with reference to FIG. 1 through 7.

Identical or like constituting elements and members shown in the drawings are represented by identical symbols and a duplicate description will be omitted as appropriate. Those of the members that are not important in describing the embodiment are omitted from the drawings.

Embodiment

FIG. 1 is a block diagram showing a configuration of a video processing apparatus 110 including an open or closed eye determination apparatus 100 according to an embodiment. The video processing apparatus 110 is, for example, a driver monitor mounted on a vehicle and images a passenger in the vehicle cabin in a temporally continuous manner. The video processing apparatus 110 may record the captured video or discard it without recording it.

The video processing apparatus 110 is disposed, for example, on a dashboard below the windshield of the vehicle, in a rearview mirror, or the like. The video processing apparatus 110 takes, for example, a video including the driver on board the vehicle as a subject of imaging, and recognizes the entire face or a facial part such as the eyes of the subject of imaging thus taken.

The video processing apparatus 110 includes a camera 60, a recording unit 70, an external output unit 80, an open or closed eye determination apparatus 100, etc. The open or closed eye determination apparatus 100 detects the orientation of the face based on the video data for the face image. The open or closed eye determination apparatus 100 determines the amount of eye openness from an eye image derived from extracting each eye region. The open or closed eye determination apparatus 100 determines the open or closed eye state included in the video data, based on the open eye reference value and the closed eye reference value. The open or closed eye determination apparatus 100 defines a difference value derived from subtracting the closed eye reference value from the open eye reference value to be 100%. The open or closed eye determination apparatus 100 determines the open or closed eye state by finding the eye openness or closedness scale, which is a proportion of the amount of eye openness relative to the difference value.

The camera 60 is an imaging apparatus having a detector such as a CMOS sensor or a CCD sensor and takes a video including, for example, the driver on board the vehicle as a subject of imaging. The camera 60 acquires video data in time in a temporally continuous manner and sends the data to the video acquisition unit 10 described later.

The recording unit 70 is, for example, a removable medium such as an SD card or a USB memory, or a hard disk. The recording unit 70 can record and delete video data acquired by the video acquisition unit 10 described later. The recording unit 70 may be configured to be removable from the video processing apparatus 110. In this case, the recording unit 70 can be removed from the video processing apparatus 110 to play back the video data on another PC, etc.

The external output unit 80 outputs the video data recorded in the recording unit 70, data on the open or closed eye state determined by the open or closed eye determination apparatus 100, etc. to the external apparatus. The external output unit 80 may output data related to the orientation of the driver's face detected by the open or closed eye determination apparatus 100, etc. to the external apparatus.

The open or closed eye determination apparatus 100 includes a video acquisition unit 10, a face orientation detection unit 20, an eye image extraction unit 30, and an open or closed eye determination unit 40. The open or closed eye determination apparatus 100 is comprised of, for example, a CPU and executes processes in the above-described units by operating according to a computer program. A storage unit 101 is comprised of a data storage apparatus such as a RAM (Random Access Memory), a flash memory, and a hard disk storage apparatus and stores a computer program executed on the open or closed eye determination apparatus 100, temporary process data, etc. Further, the storage unit 101 stores a recognition dictionary etc. for recognizing the face, eyes, etc. of the subject of imaging from the video taken.

The video acquisition unit 10 acquires video data from the camera 60, performs a process such as data compression, and outputs compressed data to the face orientation detection unit 20, the eye image extraction unit 30, and the recording unit 70. The video acquisition unit 10 may be configured to include the camera 60.

The face orientation detection unit 20 recognizes a face portion in the video data input from the video acquisition unit 10, based on the recognition dictionary stored in the storage unit 101, a learning type arithmetic model, etc. The recognition dictionary stored in the storage unit 101 includes shape data, etc. related to each part of the face. The face orientation detection unit 20 extracts a shape pattern represented in the video data and recognizes a facial part by comparing the extracted pattern with the shape data included in the recognition dictionary. The face orientation detection unit 20 can recognize a facial part from the video by using a known image recognition processing method that has been developed in various fields. For example, a method of recognizing a facial part by a learning type arithmetic model based on a neural network may be used.

Figure 2:
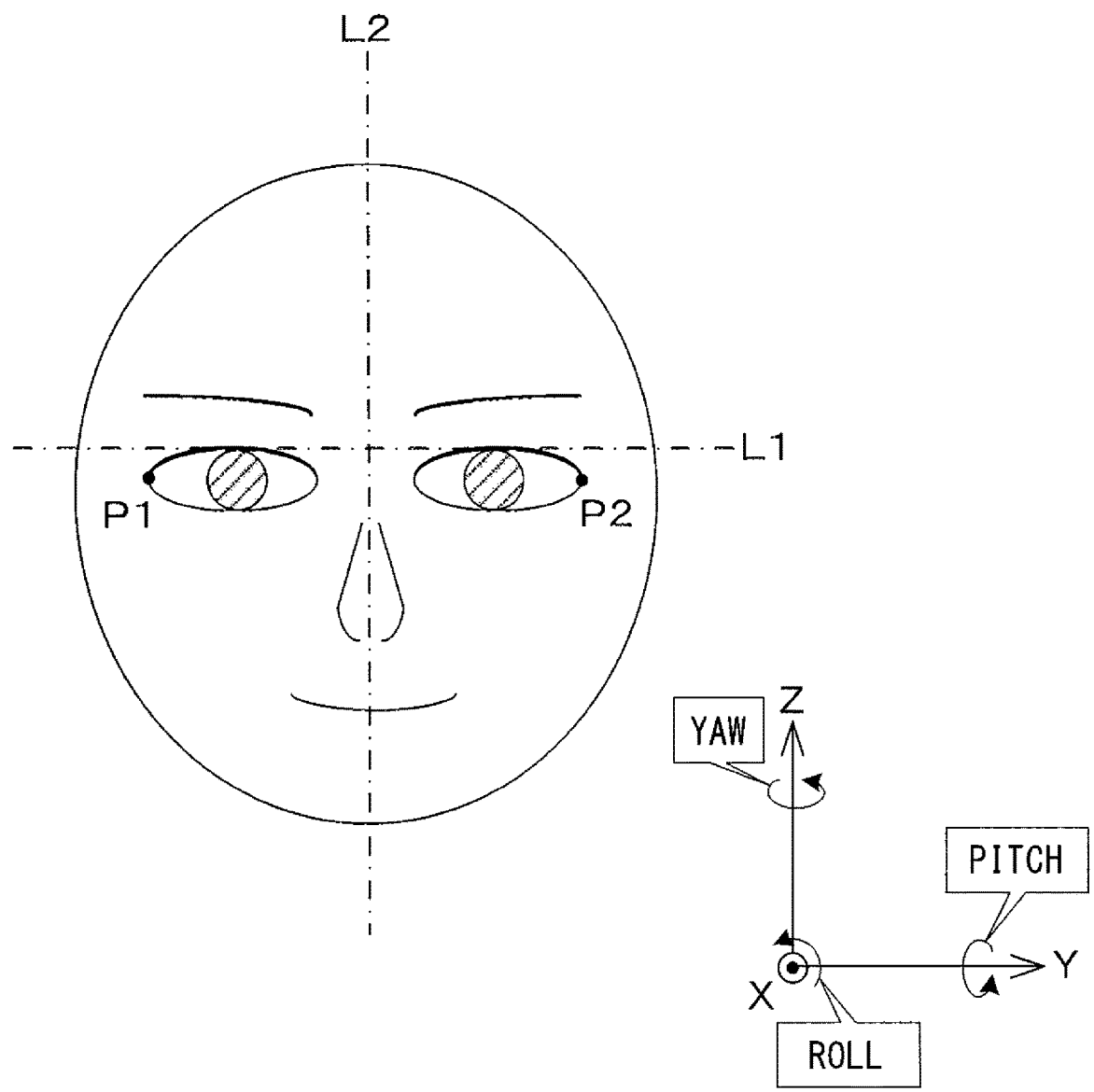
FIG. 2 is a schematic diagram for explaining the orientation of a face.

The face orientation detection unit 20 detects the orientation of the face of the subject of imaging based on data for the recognized facial part, etc. FIG. 2 is a schematic diagram for explaining the orientation of a face. FIG. 2 shows, for example, a state in which the driver's face is viewed from the front side of the vehicle. The front direction of the vehicle is defined as the X axis direction, the leftward direction of the vehicle is defined as the Y axis direction, and the upward direction of the vehicle is defined as the Z axis direction. Further, rotation around the X axis is defined as roll (rolling), rotation around the Y axis is defined as pitch (pitching), and rotation around the Z axis is defined as yaw (yawing).

The orientation of the face in the video data changes with pitching and yawing. That is, it is known that the subject of imaging has changed the orientation of the face in the vertical direction by detecting pitching in the orientation of the face. Further, it is known that the subject of imaging has changed the orientation of the face in the horizontal direction by detecting yawing in the orientation of the face.

The face orientation detection unit 20 detects the pitch angle by, for example, referring to a vertical movement of a line L1 connecting the profile lines of the upper eyelids of the left and right eyes shown in FIG. 2. Further, the face orientation detection unit 20 detects the yaw angle by referring to movements of a center line L2 of the nose, positions P1 and P2 of the left and right corners eye corners. In addition to these parts, the face orientation detection unit 20 can detect the pitch angle and the yaw angle of the face based on the movement of each facial part such as eyebrows, nose, and mouth. The face orientation detection unit 20 can use known techniques that have been developed in various technical fields for detection of the orientation of a face.

The eye image extraction unit 30 recognizes each eye part in the video data input from the video acquisition unit 10, based on the recognition dictionary stored in the storage unit 101, the learning type arithmetic model, etc. and extracts an eye image derived from extracting each eye region. The eye image extraction unit 30 recognizes the eye part by extracting a shape pattern represented in the video data and comparing the extracted pattern with the shape data included in the recognition dictionary. The eye image extraction unit 30 can recognize the eye part from the video by using a known image recognition processing scheme that has been developed in various fields. For example, a method of recognizing a face, eyes, etc. by a learning type arithmetic model based on a neural network may be used.

The open or closed eye determination unit 40 calculates an amount T of eye openness based on the eye image of each eye extracted by the eye image extraction unit 30 and determines the open or closed eye state based on the open eye reference value and the closed eye reference value. The open or closed eye determination unit 40 defines a difference value derived from subtracting the closed eye reference value from the open eye reference value to be 100%. The open or closed eye determination unit 40 determines the open or closed eye state by finding the eye openness or closedness scale, which is a proportion of the amount T of eye openness relative to the difference value.

Figure 3A:
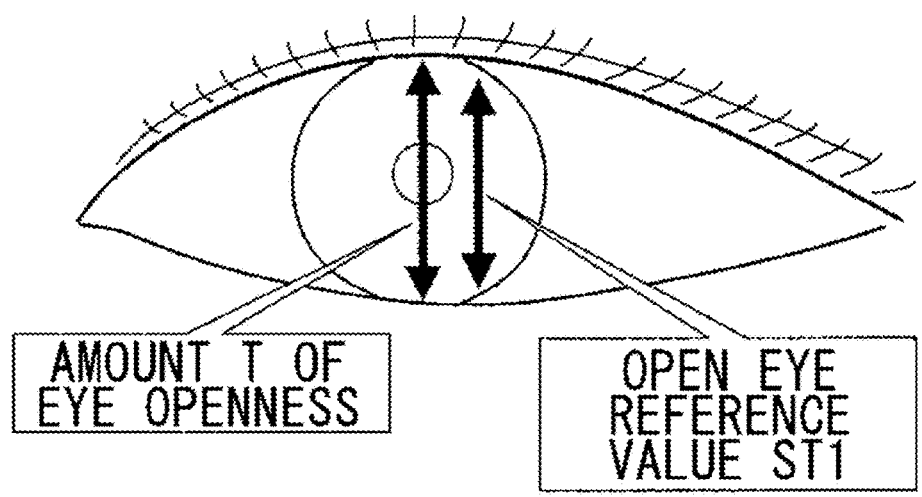
FIG. 3A is a schematic diagram showing an eye image of an open eye.
Figure 3B:
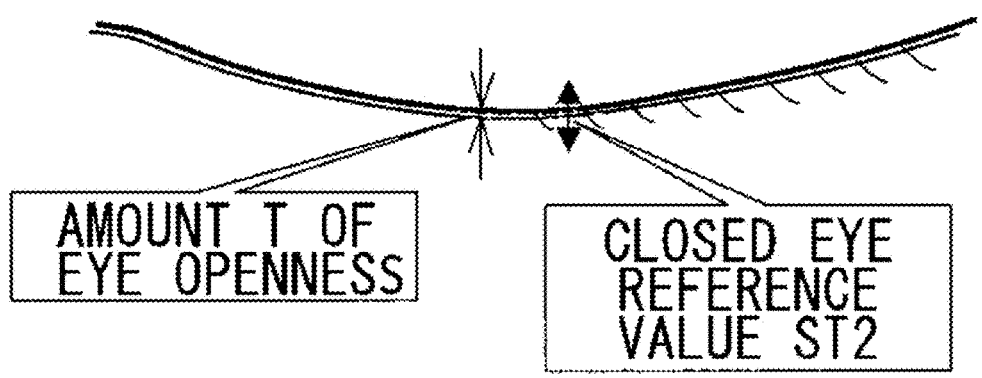
FIG. 3B is a schematic diagram showing a state in which the eye is closed.

FIG. 3A is a schematic diagram showing an eye image of an open eye, and FIG. 3B is a schematic diagram showing a state in which the eye is closed. FIG. 3A shows a state in which the eye is fully open. A margin is applied to the amount T of eye openness in this state, and a resultant slightly smaller value is set as the open eye reference value. FIG. 3B shows a state in which the eye is fully closed. A margin is applied to the amount T of eye openness in this state, and a resultant slightly larger value is set as the closed eye reference value.

The open or closed eye determination unit 40 calculates the amount T of eye openness based on the dimension in the eye height direction. The amount T of eye openness is defined as the largest of the values of the distance between the profile line of the upper eyelid and the profile line of the lower eyelid. The open or closed eye determination unit 40 may divide the extent between the inner corner of the eye and the outer corner of the eye into halves to define a central position in the horizontal direction and may define a distance between the profile line of the upper eyelid and the profile line of the lower eyelid at the central position as the amount T of eye openness. An actual dimension may be used, or a normalized value, etc. may be used as the amount T of eye openness.

Figure 4:
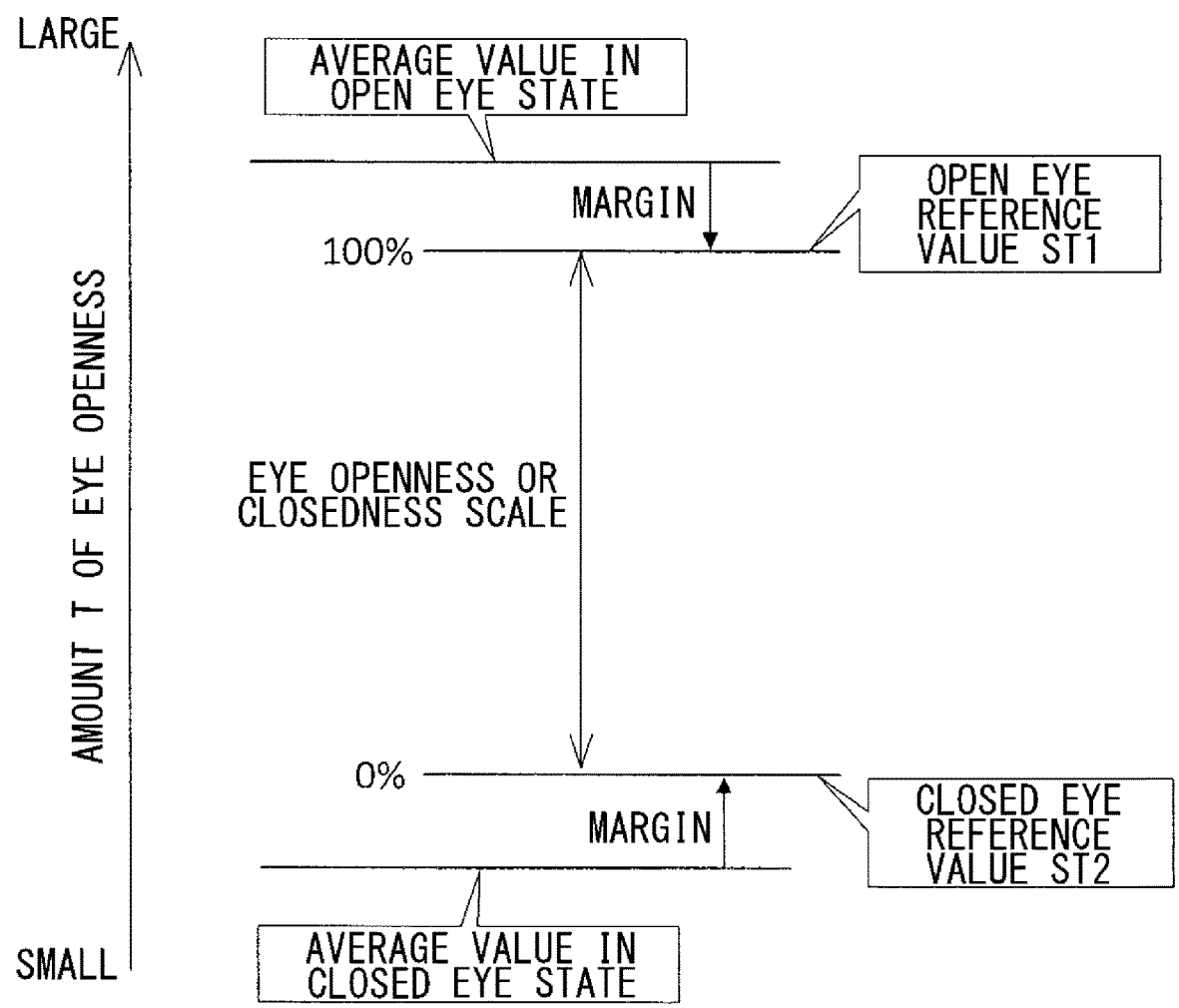
FIG. 4 is a schematic diagram for explaining the open eye reference value and the closed eye reference value.

FIG. 4 is a schematic diagram for explaining the open eye reference value and the closed eye reference value. The open or closed eye determination unit 40 first uses the default open eye reference value and closed eye reference value to categorize the amount T of eye openness calculated in the eye image acquired minute by minute into data for open eye state and data for closed eye state.

The open or closed eye determination unit 40 calculates an average value of the data for open eye state and an average value of the data for closed eye state. The open or closed eye determination unit 40 applies a margin to each average value to set the open eye reference value ST1 and the closed eye reference value ST2. For example, appropriate reference values can be set to suit the driver and the surrounding environment (brightness, etc.) by periodically updating the open eye reference value ST1 and the closed eye reference value ST2.

The eye openness or closedness scale is defined to be 100% when the amount T of eye openness is equal to the open eye reference value and to be 0% when the amount T of eye openness is equal to the closed eye reference value. The open or closed eye determination unit 40 defines a difference value derived from subtracting the closed eye reference value from the open eye reference value to be 100%. The open or closed eye determination unit 40 calculates a proportion of the amount T of eye openness relative to the difference value and defines the calculated value as the eye openness or closedness scale. When the amount T of eye openness exceeds the open eye reference value or is smaller than the closed eye reference value, the amount T of eye openness is replaced, for the purpose of calculation, such that the open eye reference value and the closed eye reference value are the upper limit value and the lower limit value, respectively. Thereby, an error occurring at the time of recognition of an eye image can be suppressed, and stable calculation of the openness or closedness scale is made possible. Alternatively, the open or closed eye determination unit 40 may divide the gamut between the open eye reference value and the closed eye reference value into, for example, 10 equal ranges and evaluate the eye openness or closedness scale in multiple stages.

Figure 5:
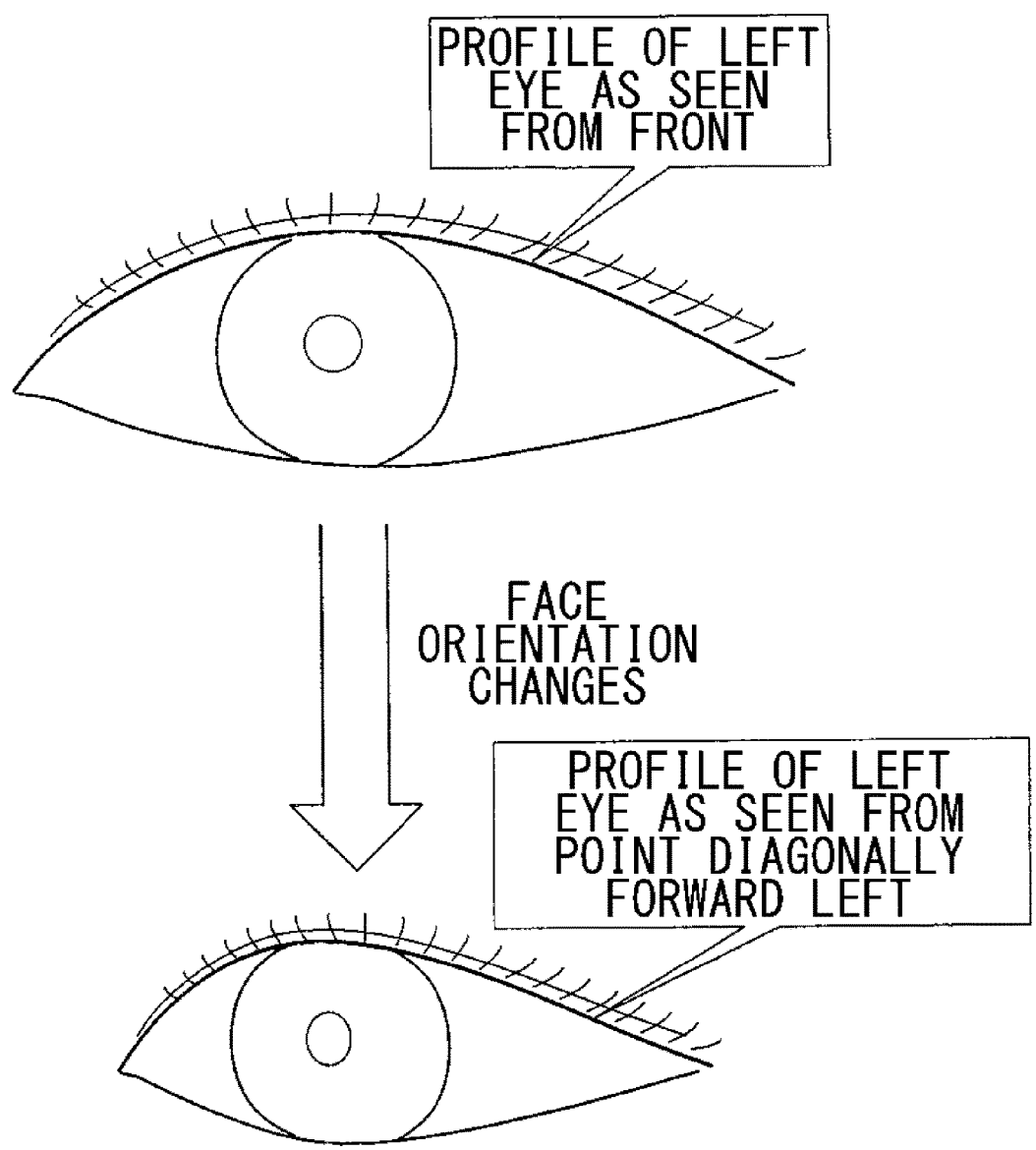
FIG. 5 is a schematic diagram for explaining the amount of eye openness that changes according to the orientation of the face.

The open or closed eye determination unit 40 switches the open eye reference value ST1 and the closed eye reference value ST2 according to the face orientation of the subject of imaging input from the face orientation detection unit 20. FIG. 5 is a schematic diagram for explaining the amount of eye openness that changes according to the orientation of the face. Given the same openness scale of the left eye, the amount T of eye openness identified in the profile of the left eye as seen from the front differs from the amount identified in the profile of the left eye as seen from a point diagonally forward left, in accordance with, for example, the undulating shape of the upper and lower eyelids.

It is considered that, when the face of the subject of imaging rotates around the Z axis and the yaw angle of the orientation of the face changes, the amount T of eye openness changes to a slightly smaller value than when the eye is viewed from the front. It is also considered that imaging of the face of the subject from a point in front and diagonally above is easily affected by the upper eyelid, etc. and that a change in the amount T of eye openness becomes more pronounced in response to a change in the yaw angle of the face orientation.

The open or closed eye determination unit 40 changes the settings of the open eye reference value ST1 and the closed eye reference value ST2 according to the orientation of the face. For example, the open or closed eye determination unit 40 sets the open eye reference value ST1 to a smaller value as the yaw angle change in the orientation of the face increases. Further, the open or closed eye determination unit 40 sets the closed eye reference value ST2 to a larger value as the yaw angle change in the orientation of the face increases. The open or closed eye determination unit 40 may set, for example, several stages of open eye reference values ST1 and closed eye reference values ST2 according to changes in the yaw angle of the face orientation. The open or closed eye determination unit 40 may assume that the impact of the yaw angle change of the face orientation on the closed eye reference value ST2 is small and sets the value ST2 to be constant. The open or closed eye determination unit 40 may change the setting of only the open eye reference value ST1.

Figure 6:
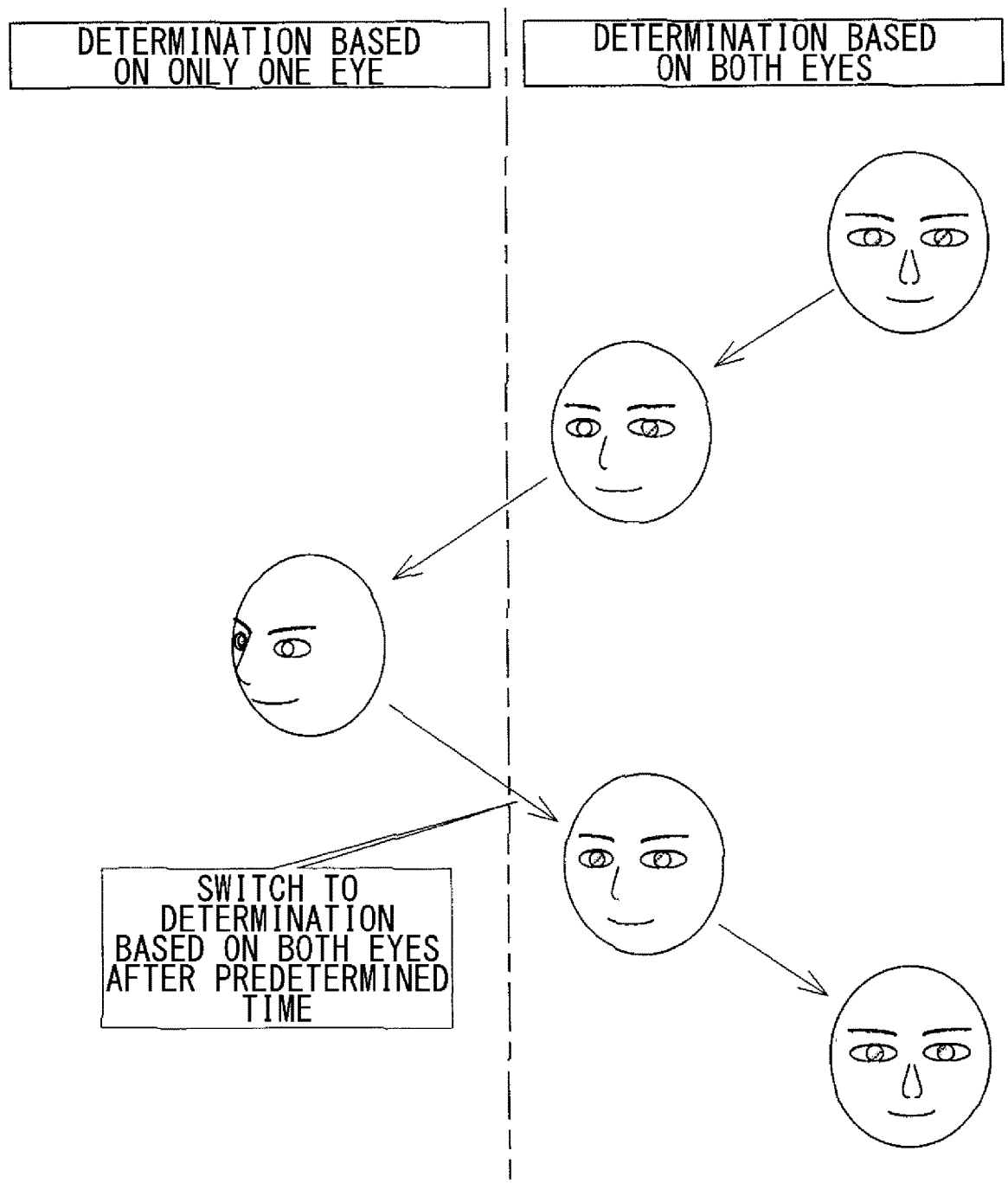
FIG. 6 is a schematic diagram for explaining determination of the open or closed eye state based on both eyes or one eye.

A description will now be given of the operation for determination of the open or closed eye state by the open or closed eye determination unit 40 based on both eyes or one eye. FIG. 6 is a schematic diagram for explaining determination of the open or closed eye state based on both eyes or one eye. When it is determined that the orientation of the face changes greatly and it is difficult to determine the open or closed state of one of the eyes, the open or closed eye determination unit 40 determines the open or closed state of only the other eye. The open or closed eye determination unit 40 determines that the openness or closedness scale of one of the eyes is undeterminable and it is difficult to determine the open or closed state, when, for example, the orientation of the face changes greatly, resulting in one of the eyes being shielded from view or the profile line of one of the eyes not being discriminable.

When the open or closed eye determination unit 40 determines that the open or closed state can be determined for both eyes in a state where the open or closed state is determined only for one eye, the open or closed eye determination unit 40 reverts to determination of the open or closed state based on both eyes. The open or closed eye determination unit 40 may revert to determination of the open or closed state based on both eyes after a predetermined time (for example, 1 second later) since it became possible to calculate the openness or closedness scale for one of the eyes for which the eye openness or closedness scale had been undeterminable.

Figure 7:
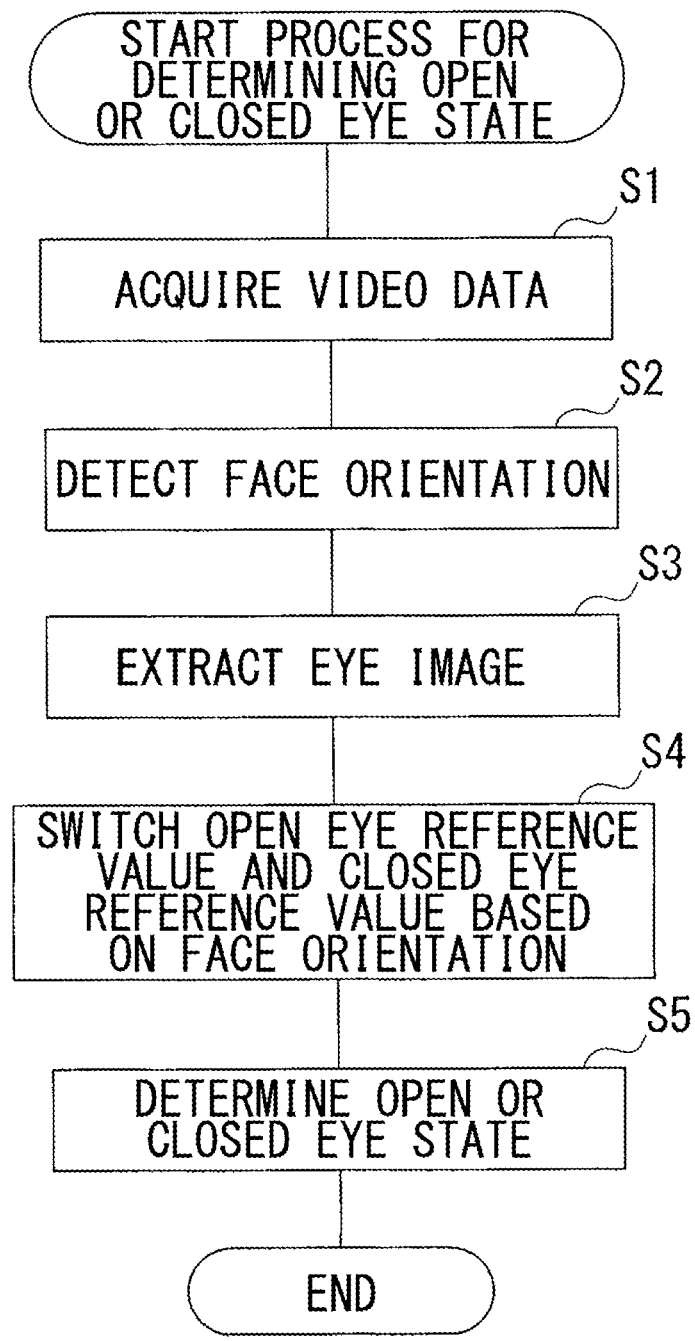
FIG. 7 is a flowchart showing a sequence of steps in a process for determining the open or closed eye state performed by the open or closed eye determination apparatus.

A description will now be given of the operation of the open or closed eye determination apparatus 100, based on a process of determining the open or closed eye state. FIG. 7 is a flowchart showing a sequence of steps in a process for determining the open or closed eye state performed by the open or closed eye determination apparatus 100. The video acquisition unit 10 of the open or closed eye determination apparatus 100 acquires video data from the camera 60 (S1). The face orientation detection unit 20 recognizes a facial part in the video data input from the video acquisition unit 10 and detects the face orientation of the subject of imaging (S2). Further, the eye image extraction unit 30 recognizes each eye part in the video data input from the video acquisition unit 10 and extracts an eye image derived from extracting each eye region (S3).

The open or closed eye determination unit 40 switches the open eye reference value ST1 and the closed eye reference value ST2 based on the face orientation detected by the face orientation detection unit 20 (S4). The open or closed eye determination unit 40 calculates a proportion of the amount T of eye openness relative to the difference value between the post-switching open eye reference value ST1 and the post-switching closed eye reference value ST2 (S5) and ends the process.

The open or closed eye determination apparatus 100 may have a plurality of open eye reference values ST1 and closed eye reference values ST2 defined in, for example, several stages. The open or closed eye determination apparatus 100 may ensure favorable precision of determination of the open or closed eye state based on the face image taken, by switching the open eye reference value ST1 and the closed eye reference value ST2 based on the face orientation.

The shape of the eyes, the shape of the eyelids, etc. differ from person to person. In the case the open or closed eye state is determined by using video data obtained by imaging a subject of imaging from a point in front and diagonally above, therefore, the reference value of eye openness or closedness scale changes as the yaw angle of the face orientation changes so that the open or closed state of the eyes may not be accurately determined. The open or closed eye determination apparatus 100 can increase the precision of determination of the open or closed eye state based on the face image, by switching the open eye reference value ST1 and the closed eye reference value ST2 according to the yaw angle change of the face orientation.

When the open or closed eye determination apparatus 100 determines that it is difficult to determine the open or closed state in an image of one of the eyes due to a significant change in the orientation of the face, the open or closed eye determination apparatus 100 can continue a determination of the open or closed eye state and, at the same time, suppress deterioration in precision, by determining the open or closed eye state based on an image of the other eye.

When the open or closed eye determination apparatus 100 determines that the open or closed state can be determined for both eyes in a state where the open or closed state is determined only for the other eye, the open or closed eye determination unit 40 reverts to determination of the open or closed state based on both eyes.

The open or closed eye determination unit 40 may revert to determination of the open or closed state based on both eyes after a predetermined time (for example, 1 second later) since it became possible to calculate the openness or closedness scale for one of the eyes for which the eye openness or closedness scale had been undeterminable. If an operation of switching back to determination of the openness or closedness scale based on both eyes is started instantly in a video frame in which it has become possible to calculate the openness or closedness scale for one of the eyes, for which the eye openness or closedness scale had been undeterminable, the openness or closedness scale of one of the eyes may become undeterminable again in a subsequent frame, resulting in an unstable determination result. This could happen when, for example, the orientation of the face of the subject of imaging is not stable.

For this reason, the open or closed eye determination apparatus 100 switches to determination of the open or closed state based on the other eye, for which the eye openness or closedness scale is correctly calculated, instantly when the openness or closedness scale of one of the eyes becomes undeterminable. To revert to determination based on both eyes again, the open or closed eye determination apparatus 100 switches the mode after a predetermined period of time since it became possible to calculate the openness or closedness scale of one of the eyes.

Alternatively, when the open or closed eye determination apparatus 100 reverts to determination by both eyes again, the open or closed eye determination apparatus 100 may switch from determination of the open or closed eye state based on one of the eyes to determination of the open or closed eye state based on both eyes, when the eye is closed by blinking and then becomes open. The eye for which blinking is detected is not limited to one eye or both eyes. Detection of an eye blink allows the open or closed eye determination apparatus 100 to evaluate that calculation of the open or closed state of both eyes is timed in a manner more stable than otherwise. It is therefore possible to determine the post-switching open or closed eye state in a more stable manner.

There are cases that the eye openness or closedness scale cannot be calculated correctly in the presence of mirroring or light reflection on eyewear lenses. Even when the openness or closedness scale cannot be calculated for one of the eyes due to mirroring or light reflection on eyewear lenses, the open or closed eye determination apparatus 100 can determine, unless the other eye is affected by the eyewear lenses, the open or closed eye state by calculating the eye openness or closedness scale of only the eye that is not affected. The open or closed eye determination apparatus 100 can estimate the position of the eye by referring to the previous frame in the video data and can, when there is a pixel having high brightness near the position of the eye, determine that there is mirroring or light reflection on eyewear lenses.

Variation

The open or closed eye determination apparatus 100 may periodically (e.g., every hour or every day) update the open eye reference value ST1 and the closed eye reference value ST2. The open or closed eye determination unit 40 of the open or closed eye determination apparatus 100 uses, for example, the current open eye reference value and closed eye reference value to categorize the amount T of eye openness calculated in the eye image acquired minute by minute into data for open eye state and data for closed eye state. Each reference value may be stored in the storage unit 101, etc. in association with each time zone.

The open or closed eye determination unit 40 calculates an average value of the data for open eye state and an average value of the data for closed eye state. The open or closed eye determination unit 40 applies a margin to each average value to update the values to the new open eye reference value ST1 and closed eye reference value ST2. In the case that the driver is switched, the open or closed eye determination apparatus 100 can precisely determine the open or closed eye state of the new driver by periodically updating the open eye reference value ST1 and the closed eye reference value ST2.

The open or closed eye determination apparatus 100 can set the open eye reference value ST1 and the closed eye reference value ST2 properly to adapt to a physical change in the amount T of eye openness due to a change in light amount at night, under a cloudy weather, under a clear weather, in a long tunnel, etc., by periodically updating the open eye reference value ST1 and the closed eye reference value ST2.

The open or closed eye determination apparatus 100 is described, by way of example, as setting a plurality of open eye reference values ST1 and closed eye reference values ST2 in response to a change in the yaw angle of the face orientation. Alternatively, the open or closed eye determination apparatus 100 may set a plurality of open eye reference values ST1 and closed eye reference values ST2 in response also to a change in the pitch angle or the roll angle. Alternatively, the open or closed eye determination apparatus 100 may set a plurality of open eye reference values ST1 and closed eye reference values ST2 in response also to a combination of two or more of a yaw angle change, a pitch angle change, and a roll angle change and to each angle change in the combination.

A description will now be given of the features of the open or closed eye determination apparatus 100 and the eye opening and closing determination method according to the above-described embodiment and variation. The open or closed eye determination apparatus 100 includes a video acquisition unit 10 corresponding to a video acquirer, a face orientation detection unit 20 corresponding to a face orientation detector, an eye image extraction unit 30 corresponding to an eye image extractor, and an open or closed eye determination unit 40 corresponding to an open or closed eye determinator. The video acquisition unit 10 acquires video data from the camera 60. The face orientation detection unit 20 detects the face orientation based on a face image in the video data acquired by the video acquisition unit 10. The eye image extraction unit 30 extracts an eye image including an eye region based on the face image in the video data acquired by the video acquisition unit 10. The open or closed eye determination unit 40 determines the open or closed eye state based on the amount of eye openness acquired from the eye image, the open eye reference value, and the closed eye reference value. The open or closed eye determination unit 40 has the open eye reference value and the closed eye reference value corresponding to the face orientation and switches the open eye reference value and the closed eye reference value based on the face orientation detected by the face orientation detection unit 20. Thereby, the open or closed eye determination apparatus 100 can precisely determine an open or closed eye state based on a face image taken.

Further, when it is difficult to determine the open or closed eye state in an image of one of the eyes, the open or closed eye determination unit 40 determines the open or closed eye state based on an image of the other eye. Thereby, the open or closed eye determination apparatus 100 can suppress deterioration in precision of determination of the open or closed eye state.

Further, when a change to a state in which it is possible to determine the open or closed eye state in an image of one of the eyes occurs, the open or closed eye determination unit 40 reverts from a state in which the open or closed eye state is determined based on an image of the other eye to a state in which the open or closed eye state is determined based on images of both eyes. Thereby, the open or closed eye determination apparatus 100 can precisely determine an open or closed eye state.

The open or closed eye determination apparatus 100 may also revert to determination of the open or closed eye state based on images of both eyes after an eye blink is detected. The detection allows the open or closed eye determination apparatus 100 to evaluate that it is possible to calculate the open or closed state of both eyes accurately and to determine the post-switching open or closed eye state properly.

The open or closed eye determination method in the open or closed eye determination apparatus 100 includes a video acquisition step, a face orientation detection step, an eye image extraction step, and an open or closed eye determination step. The video acquisition step acquires video data from the camera. The face orientation detection step detects the face orientation based on a face image in the video data acquired by the video acquisition step. The eye image extraction step extracts an eye image including an eye region based on the face image in the video data acquired by the video acquisition step. The open or closed eye determination step determines the open or closed eye state based on the amount of openness of the eye acquired from the eye image, the open eye reference value, and the closed eye reference value. The open or closed eye determination step has the open eye reference value and the closed eye reference value corresponding to the face orientation and switches the open eye reference value and the closed eye reference value based on the face orientation detected by the face orientation detection step. The open or closed eye determination method as described above provides a favorable precision of determination of the open or closed eye state based on the captured face image.

A non-transitory recording medium for open or closed eye determination encoded with a program according to an embodiment causes a computer to implement a video acquisition step, a face orientation detection step, an eye image extraction step, and an open or closed eye determination step. The video acquisition step acquires video data from the camera. The face orientation detection step detects the face orientation based on a face image in the video data acquired by the video acquisition step. The eye image extraction step extracts an eye image including an eye region based on the face image in the video data acquired by the video acquisition step. The open or closed eye determination step determines the open or closed eye state based on the amount of openness of the eye acquired from the eye image, the open eye reference value, and the closed eye reference value. The open or closed eye determination step has the open eye reference value and the closed eye reference value corresponding to the face orientation and switches the open eye reference value and the closed eye reference value based on the face orientation detected by the face orientation detection step. The recording medium for open or closed eye determination as described above provides a favorable precision of determination of the open or closed eye state based on the captured face image.

Described above is an explanation based on an exemplary embodiment. The embodiments are intended to be illustrative only and it will be understood to those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

What is claimed is:

1. An open or closed eye determination apparatus comprising:
   a video acquirer that acquires video data from a camera;
   a face orientation detector that detects a face orientation based on a face image in the video data acquired by the video acquirer;
   an eye image extractor that extracts an eye image including an eye region based on the face image in the video data acquired by the video acquirer; and
   an open or closed eye determinator that determines an open or closed eye state based on an amount of eye openness acquired from the eye image, an open eye reference value, and a closed eye reference value,
   wherein the open or closed eye determinator has the open eye reference value and the closed eye reference value corresponding to a face orientation and switches the open eye reference value and the closed eye reference value based on the face orientation detected by the face orientation detector,
   wherein when it is difficult to determine the open or closed eye state in an image of one the eyes, the open or closed eye determinator determines the open or closed eye state based on an image of the other eye, and
   wherein when a change to a state in which it is possible to determine the open or closed eye state in the image of one of the eyes occurs, the open or closed eye determinator reverts from a state in which the open or closed eye state is determined based on the image of the other eye to a state in which the open or closed eye state is determined based on images of both eyes.

2. The open or closed eye determination apparatus according to claim 1, wherein after an eye blink is detected, the open or closed eye determinator reverts to a state in which the open or closed eye state is determined based on images of both eyes.

3. An open or closed eye determination method comprising:
   acquiring video data from a camera;
   detecting a face orientation based on a face image in the video data acquired;
   extracts an eye image including an eye region based on the face image in the video data acquired; and
   determining an open or closed eye state based on an amount of eye openness acquired from the eye image, an open eye reference value, and a closed eye reference value,
   wherein the determining has the open eye reference value and the closed eye reference value corresponding to a face orientation and switches the open eye reference value and the closed eye reference value based on the face orientation detected,
   wherein when it is difficult to determine the open or closed eye state in an image of one the eyes, the determining determines the open or closed eye state based on an image of the other eye, and
   wherein when a change to a state in which it is possible to determine the open or closed eye state in the image of one of the eyes occurs, the determining reverts from a state in which the open or closed eye state is determined based on the image of the other eye to a state in which the open or closed eye state is determined based on images of both eyes.

4. A non-transitory recording medium for open or closed eye determination encoded with a program causing a computer to implement:
   acquiring video data from a camera;
   detecting a face orientation based on a face image in the video data acquired;
   extracts an eye image including an eye region based on the face image in the video data acquired; and
   determining an open or closed eye state based on an amount of eye openness acquired from the eye image, an open eye reference value, and a closed eye reference value,
   wherein the determining has the open eye reference value and the closed eye reference value corresponding to a face orientation and switches the open eye reference value and the closed eye reference value based on the face orientation detected,
   wherein when it is difficult to determine the open or closed eye state in an image of one the eyes, the determining determines the open or closed eye state based on an image of the other eye, and
   wherein when a change to a state in which it is possible to determine the open or closed eye state in the image of one of the eyes occurs, the determining reverts from a state in which the open or closed eye state is determined based on the image of the other eye to a state in which the open or closed eye state is determined based on images of both eyes.

* * * * *